United States Patent
Van Gassel et al.

(10) Patent No.: US 7,702,940 B2
(45) Date of Patent: Apr. 20, 2010

(54) POWER SAVING METHOD AND SYSTEM

(75) Inventors: Jozef Pieter Van Gassel, Eindhoven (NL); Ozcan Mesut, Eindhoven (NL); Johannes Henricus Maria Korst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 327 days.

(21) Appl. No.: 10/581,117

(22) PCT Filed: Nov. 22, 2004

(86) PCT No.: PCT/IB2004/052506

§ 371 (c)(1),
(2), (4) Date: May 30, 2006

(87) PCT Pub. No.: WO2005/055226

PCT Pub. Date: Jun. 16, 2005

(65) Prior Publication Data

US 2007/0204124 A1 Aug. 30, 2007

(30) Foreign Application Priority Data

Dec. 3, 2003 (EP) .................................. 03104522

(51) Int. Cl.
*G06F 1/00* (2006.01)
*G06F 1/32* (2006.01)

(52) U.S. Cl. .................. 713/324; 713/300; 713/320; 713/321; 711/113; 711/118; 711/170; 700/297; 710/18; 710/52

(58) Field of Classification Search .............. 713/324, 713/300, 320, 321; 711/113, 118, 170; 700/297; 710/18, 52

See application file for complete search history.

(56) References Cited

U.S. PATENT DOCUMENTS

| | | | | |
|---|---|---|---|---|
| 5,615,162 A | * | 3/1997 | Houston | 365/226 |
| 5,712,976 A | * | 1/1998 | Falcon et al. | 725/115 |
| 5,719,800 A | * | 2/1998 | Mittal et al. | 713/321 |
| 5,898,880 A | * | 4/1999 | Ryu | 713/323 |
| 5,928,365 A | * | 7/1999 | Yoshida | 713/324 |
| 6,061,732 A | * | 5/2000 | Korst et al. | 709/231 |
| 6,684,298 B1 | * | 1/2004 | Dwarkadas et al. | 711/128 |
| 7,100,013 B1 | * | 8/2006 | de Waal | 711/170 |
| 7,127,560 B2 | * | 10/2006 | Cohen et al. | 711/141 |
| 7,461,393 B1 | * | 12/2008 | Kishitaka et al. | 725/131 |

(Continued)

FOREIGN PATENT DOCUMENTS

JP 60224186 A * 11/1985

(Continued)

*Primary Examiner*—Henry W. H. Tsai
*Assistant Examiner*—Steven G Snyder

(57) ABSTRACT

The present invention relates to reduction of power consumption of electronic mass storage devices, and more particularly to such a reduction of power consumption in mobile infotainment products. These devices are equipped with a subsystem comprising a mass storage device (48) and a buffer memory (43, 44). The size of the buffer memory (43, 44) is adapted in such a way that optimally low power consumption is achieved. This accomplishment by activating or deactivating memory banks (45) comprised in the buffer memory chips. The amount of memory banks (45) activated is determined by operating characteristics of the subsystem, e.g. a desired bit-rate to be achieved for transmissions to/from the mass storage device (48).

16 Claims, 3 Drawing Sheets

U.S. PATENT DOCUMENTS

| | | | |
|---|---|---|---|
| 2001/0003207 A1* | 6/2001 | Kling et al. | 713/320 |
| 2002/0045961 A1* | 4/2002 | Gibbs et al. | 700/94 |
| 2003/0145239 A1* | 7/2003 | Kever et al. | 713/300 |
| 2003/0154246 A1* | 8/2003 | Ollikainen | 709/203 |
| 2004/0062119 A1* | 4/2004 | Stimak et al. | 365/222 |
| 2004/0215986 A1* | 10/2004 | Shakkarwar | 713/300 |
| 2005/0071561 A1* | 3/2005 | Olsen et al. | 711/118 |
| 2007/0136522 A1* | 6/2007 | Umemura et al. | 711/113 |

FOREIGN PATENT DOCUMENTS

| | | | |
|---|---|---|---|
| JP | 05012895 A | * | 1/1993 |
| JP | 10340519 A | * | 12/1998 |
| JP | 2005025364 A | * | 1/2005 |

* cited by examiner

POWER SAVING METHOD AND SYSTEM

This invention pertains in general to the field of saving energy by reducing the power consumption of electrically powered systems, and more particularly to the reduction of power consumption of electronic mass storage devices, and even more particularly to such a reduction of power consumption in mobile infotainment products.

Mobile storage apparatuses comprise generally mass storage devices, such as Hard Disk Drives (HDD) or optical bit engines. Power consumed by these HDDs or optical bit engines form a significant part of the overall power consumed by such mobile device. As such portable devices, e.g. infotainment devices are run on a limited power source, i.e. a battery, it is desired that the operating time with a fully loaded battery is as long as possible before the battery has to be replaced or recharged. This is one of the reasons that the device should consume as little energy as possible.

One principal solution to save energy when using such a storage device, is to switch off the device, when data is not read or written. However, in this case, data access is very slow, when the storage device starts up again after having been inactive. Alternatively, a storage device has been disclosed in WO01/15161, which has several levels of power consumption modes. The device progressively transitions into lower power consumption modes as time proceeds from the last read or write access to/from the device. However, also this device suffers from the disadvantage of long access times when returning to the full power state from a substantially lower power state, i.e. partial shut-down or shut-down of the storage device.

For audio, video or audio-visual streaming applications, for instance in mobile infotainment devices, such as portable MP3 or DVD players, the total energy consumed can, in addition to the above-mentioned method, be significantly reduced by using a buffer memory and buffering schemes. These schemes exploit the fact that it is more efficient to read or write data in a bursty way with a high transmission bit-rate and subsequently to power down the drive, or alternatively to put the drive in standby mode, for as long as possible. During the time, in which the drive is powered down or in standby, data is read or written respectively from or to the buffer. An example for this type of buffered data transfer is given in U.S. Pat. No. 6,496,915.

To this end, solid state RAM is used to buffer the audio-visual data until it is ready to be further processed, either by being consumed by a decoder in the playback case or by being written to the storage medium in the case of recording. This procedure is independent of the storage medium used, wherein typical storage media are e.g. HDDs, CDs, DVDs, BluRay discs or SFFO (Small Form Factor Optical) discs. However, for the sake of simplicity, the remainder of this description will only deal with HDDs. The total power consumed by such a subsystem is determined by the sum of both the powers consumed by the HDD and the buffering solid state RAM. Although the power consumed by the RAM appears at first sight small compared to the power consumption of disc drives, it is not negligible, especially in the case of DRAMs. Power consumption of the buffer is approximately proportional to the buffer size. Furthermore, the larger the size of the buffer, the less power consumes the disc drive. However, at the same time, the buffer memory's power consumption increases with size. In JP-2000298935, it has been proposed to reduce power consumption of a buffer by providing a hardware buffer solution having a small capacity part for high frequency use and a large capacity part for low frequent use. However, this solution is not flexible, as different bit rates to/from the storage device demand different ratios of the two buffer parts. Furthermore, the number of physical chips and internal banks determines in such a design the power consumption, which is fixed and cannot be further reduced due to the design disclosed in JP-2000298935.

Hence, the object of the invention is to provide an adaptive minimisation of the total power consumption of a subsystem comprising a mass storage device and a buffer memory, without impacting the performance of the subsystem under different operating conditions.

The present invention overcomes the above-identified deficiencies in the art and solves at least the above identified problems by providing a method, an apparatus, and a computer-readable medium for adaptively minimising the total power consumption of a subsystem comprising a mass storage device and a buffer memory, according to the appended patent claims.

The general solution according to the invention is to adaptively modify the characteristics of a buffer memory with regard to operating entities of a subsystem, comprising a mass storage device and the buffer memory, for minimising the power consumption of the subsystem in total, such that the subsystem has an optimally low power consumption for a given set of operating entities of the subsystem.

More particularly, an ideal buffer size is determined, and certain areas of the buffer are shut down, such that optimally low power consumption is achieved for a predetermined performance of the subsystem.

According to aspects of the invention, a method, an apparatus, and a computer-readable medium for adaptively minimising the total power consumption of an apparatus comprising a mass storage device and a buffer memory are disclosed.

The present invention has the advantage over the prior art that it adapts the buffer size with regards to current requirements, thus optimally using the subsystem at a given performance within a wide performance range and with a minimum of energy.

Further objects, features and advantages of the invention will become apparent from the following description of embodiments of the present invention, reference being made to the accompanying drawings, in which FIG. 1 is a graph illustrating the influence of buffer size on total power consumption of the subsystem;

Figure 2:
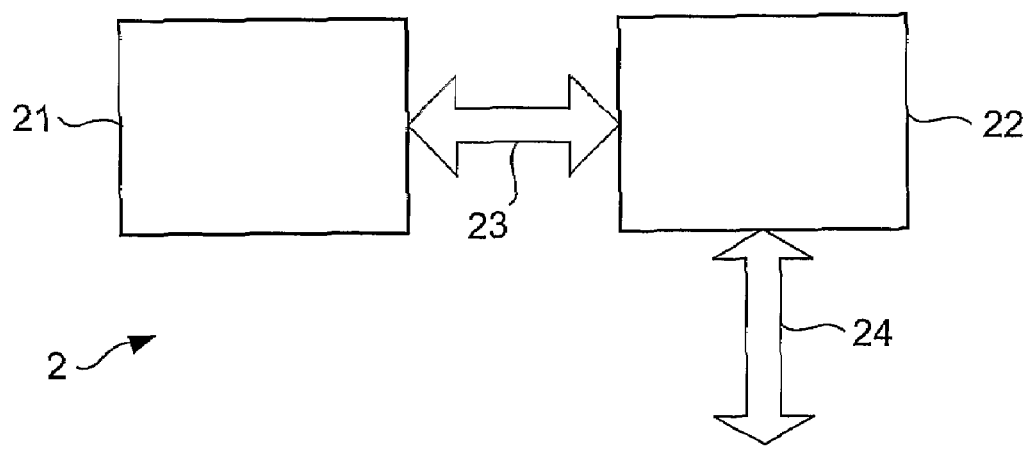
FIG. 2 is a schematic illustration of a subsystem comprising a mass storage device and a buffer memory.
Figure 3:
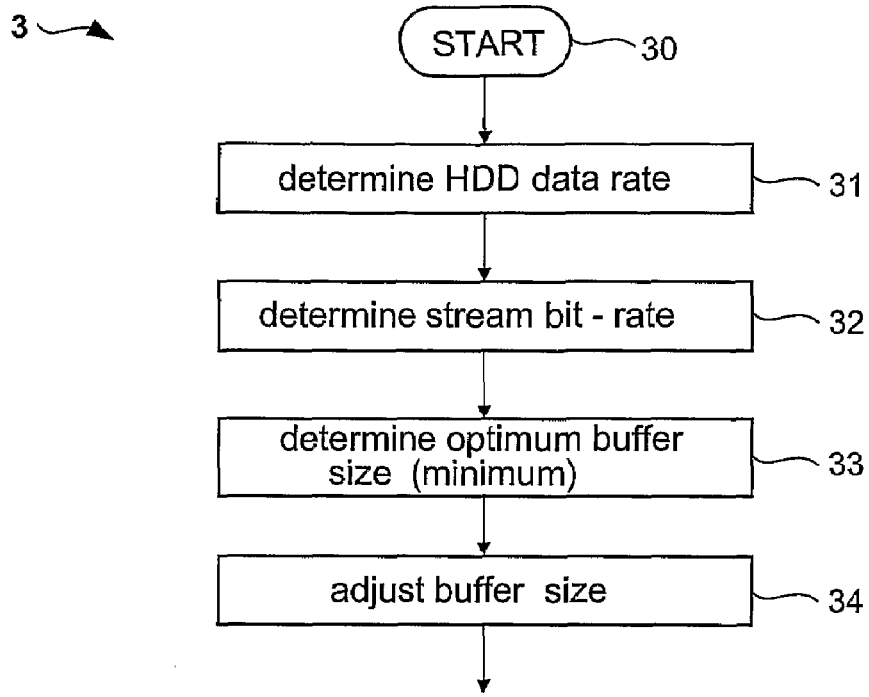
FIG. 3 is a flow chart of an embodiment of the invention.

According to an embodiment of one aspect of the invention, the characteristics of the following three entities are in steps of a method 3, as shown in FIG. 3, adaptively determined and modified for minimising the power consumption of a subsystem 2, as shown in FIG. 2, comprising a mass storage device 21, such as a HDD, and a SDRAM buffer memory 22:

the HDD 21 or optical bit engine
the SDRAM scheduling buffers 22
the bit rate of the audio/video stream 24.

Data stream 23 to/from the HDD to the buffers 22 is generally performed at a fixed rate, wherein the rate is fixed for a given HDD location. The actual speed varies generally with the location on disc due to the constant angular velocity with which data is read from the disc. The actual value may in each case be determined, alternatively an average may be used for a given stream. Furthermore, data rates of Constant Angular Velocity (CAV) optical drives are also location dependent. On the other hand, Constant Linear Velocity (CLV) optical drives have a fixed data rate, which is independent of the disc location, whereby in this case a fixed data rate can be assumed. Moreover, data is read in a bursty manner, as described above. Calculations and verification experiments performed by the inventors have shown that the HDD power consumption asymptotically reduces to a minimum value determined by the division of the bit-rates of the stream and the maximum throughput of the HDD as a function of the scheduler buffer size. Furthermore, the maximum HDD throughput depends on the disk location, i.e. different zones exist. Outer zones have a higher bit density than inner zones, i.e. a higher bit density results in a higher throughput in a CAV system. On the other hand, the power consumption of the SDRAMs increases generally linearly with increasing SDRAM size. From the literature it is known, that the SDRAM power increases linearly with the SDRAM size. Calculations for existing SDRAM chips also verify this. Note that SDRAM power does not increase with buffer size but with SDRAM size. The buffer size may be smaller than the SDRAM size. Both power consumption of the SDRAMs and of the HDD are plotted in the diagram shown FIG. 1 for a typical drive, wherein typical SDRAM sizes for a video stream of 4 Mbps are shown.

Figure 1:
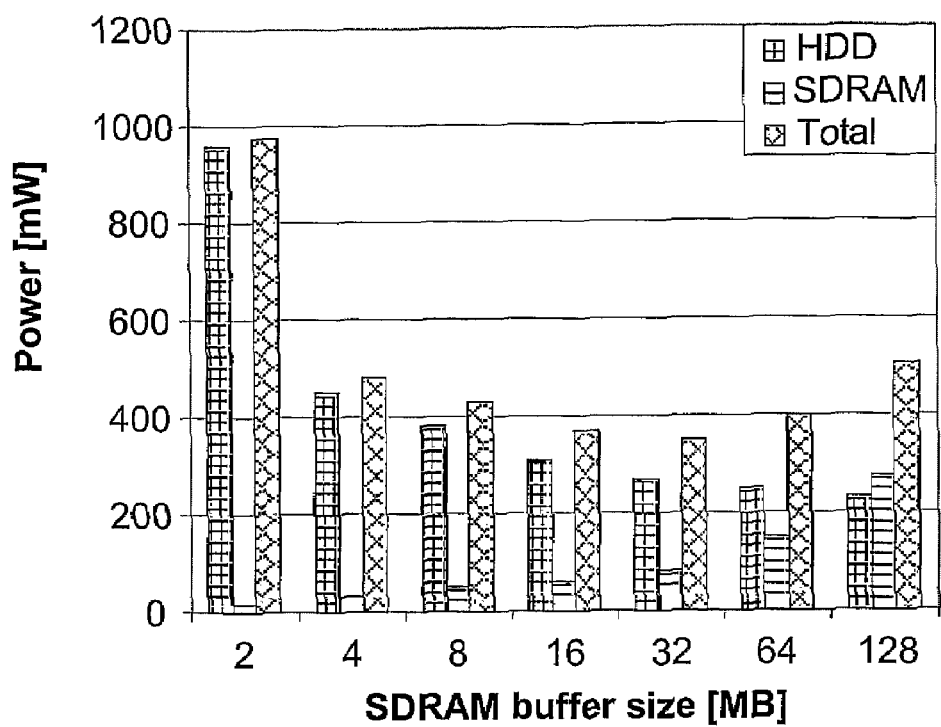

As can be seen in FIG. 1, the overall power consumption is optimum for a particular combination of the three above-mentioned entities at a certain scheduler buffer size.

Furthermore, it is assumed that the power consumption characteristics of the HDD and the SDRAMs is stationary over time, except for wear and tear of the HDD. Slightly varying performance may be easily tracked by measuring the actual data throughput as an alternative to assuming a constant value.

The optimum buffer size for a low bit-rate application, such as playing back music with for instance 128 kbps, is different from that of a high bit-rate application like a camcorder recording with e.g. 27 Mbps. Thus the optimum buffer size of the subsystem's buffer memory will vary over time with respect to different applications using the subsystem.

In case of multiple simultaneous streams, the sum of the bit-rates of all streams is regarded.

Hence, the subsystem's buffer memory has to have a size sufficiently large, in order to provide low power consumption of the subsystem as a total for high bit-rates. However, this leads to undesired excessive power consumption in low bit-rate applications.

The above-mentioned method, shown in FIG. 3, starts at step 30, when e.g. a HDD scheduler initiates a new stream, whereupon in step 31 the HDD data rate is determined. In step 32 the stream bit-rate to/from the buffer memory is determined, wherein the stream bit-rate is generally the average bit-rate of the stream, but may be variable within certain limits for bit-rate encodings. Subsequently, the optimum buffer size, i.e. the buffer size at the above-described minimum of power consumption of the sub-system, is determined in step 33. This may be performed by e.g. actively varying buffer size and measuring/feeding back power consumption, by calculating the optimum buffer size from a formula or by means of a look-up table. When the optimum buffer size ensuring the lowest power consumption of the subsystem is determined, this optimum buffer size is adjusted in step 34. Subsequently, the subsystem runs with the lowest energy consumption possible for a given streaming bit-rate. Note that in variable bit-rate streams the average bit-rate will vary within a certain range.

According to an embodiment of another aspect of the invention, a mobile device is provided. The mobile device comprises at least one SDRAM IC having a number of internal memory banks. Mobile SDRAMs often have a feature that allows them to selectively switch off some of these memory banks. This is sometimes called Partial Array Self Refresh (PASR).

The disk scheduler, that is responsible for accessing the HDD and the SDRAM buffer, uses knowledge on the HDD and the SDRAM to dynamically determine the optimum memory configuration. More precisely, this act is performed each time a new stream is admitted for streaming. The characteristics of the HDD and SDRAMs are stored in the application. If changes over time are expected, e.g. in case of the HDD, these characteristics may be retrieved from the drive itself, e.g. via a special command that is e.g. based on measurements of the HDD.

Figure 4:
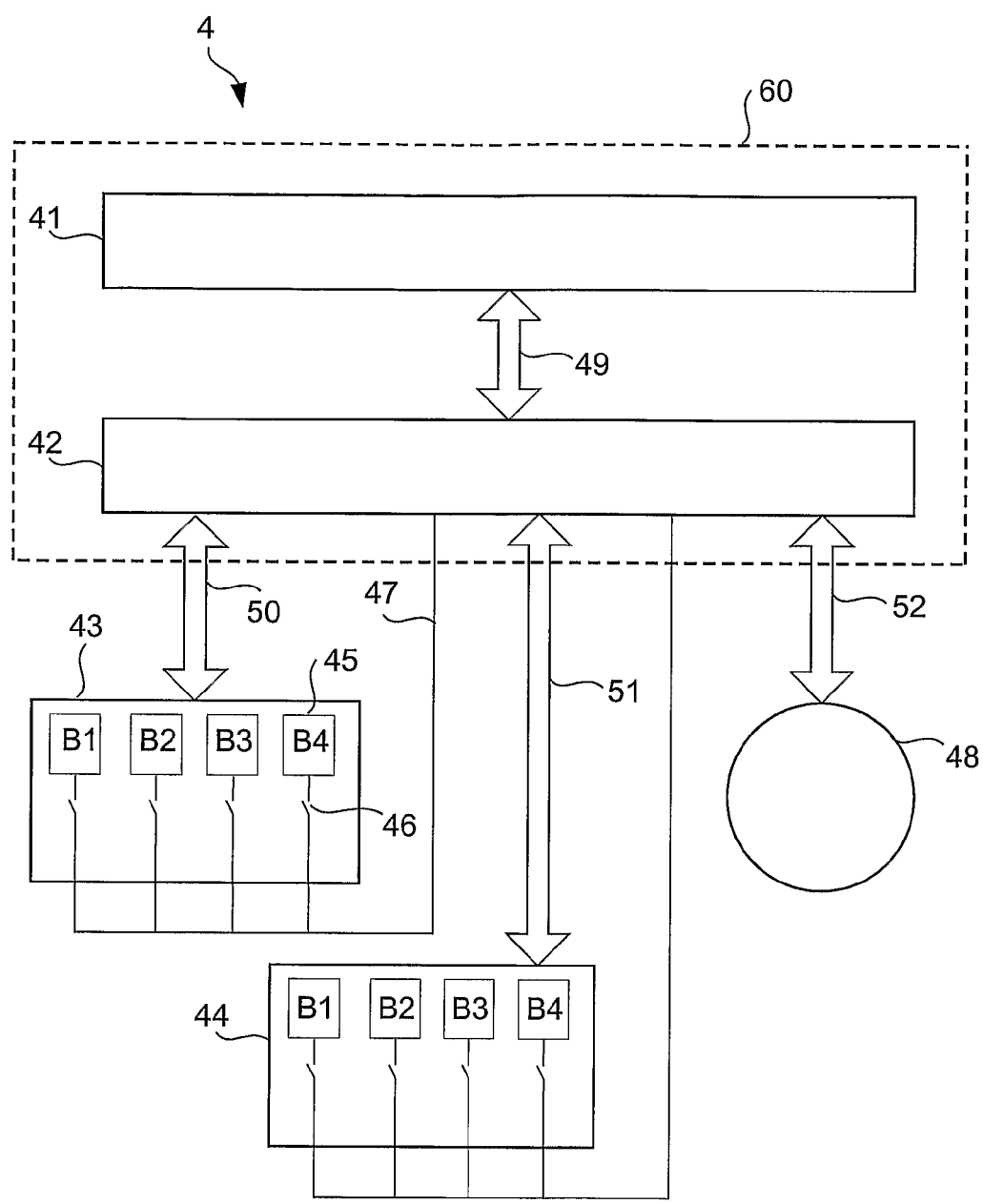
FIG. 4 is a schematic illustration of a mobile device according to an embodiment of the invention.

FIG. 4 illustrates the current embodiment more detailed. An exemplary subsystem 4 comprises an application device 41, reading or writing data from or to a HDD 48, as indicated by data transmission arrow 49. Data is not transmitted directly from/to the HDD, but by means of a Low-power HDD scheduler 42. Scheduler 42 controls data flows 50, 51 from/to buffer memory chips 43, 44, such as SDRAMs, data flow 52 to/from the HDD and data flow 49 to/from the application 41. The streaming rate of data flow 52 to/from the HDD is fixed and determined by the hardware, wherein the dominant factor is the access speed to the actual medium, which in turn is determined by rotations per minute and/or medium characteristics. Usually the bus connected to the HDD is faster than the actual storage medium. In PCs the hardware interface is usually faster than the HDD. However, in CE applications this might not be the case. Furthermore the scheduler 42 controls which memory banks 45 B1, . . . B4 are active. This is done by means of switches 46 having control lines 47 connected to the scheduler 42, i.e. the scheduler 42 determines the configuration of memory banks by switching these memory banks on or off. If the banks are internal, switching may occur by setting a register in the SDRAM. Hence, the only unknown entity at the time of designing the subsystem 4 is the bit-rate of the streams 49, 50 and 51, wherein the total bit-rate depends on the application type or the number of simultaneous streams. Every time the application 41 requests the scheduler 42 to start a new stream, it recalculates the optimum buffer size for that particular configuration of the stream, or of the plurality of streams. Subsequently, the scheduler 42 powers up the optimum memory bank configuration. That means, a number of internal memory banks 45 is activated, ensuring the minimum power consumption, according to the above reasoning with reference to FIG. 1, for the given characteristics of the HDD 48, the SDRAM 43, 44 and the bit-rate of the stream.

Hence, the buffer size is determined in a number of banks/ chips and hence the actual calculated number will be rounded off to an integer number of banks for implementational reasons.

In a dynamic configuration with multiple simultaneous streams, two different situations are distinguished. Firstly, when a new stream is admitted by the scheduler and secondly, a stream is stopped and removed by the scheduler. The first case is achieved by powering up extra memory banks. For the second case, it has to be considered, that memory banks still containing buffered data must not be switched off, as otherwise the data is lost. Therefore, powering off of such a memory bank is e.g. either delayed or the buffered data of that memory bank is moved to another memory bank that will remain powered on after which the first memory bank is powered off.

The scheduler 42 or both the scheduler 42 and the application 41 can be embodied as dedicated circuits 1 ASICs) or one or more programmed microprocessors, thus providing a processing 60 unit that carries out this embodiment of the method according to the invention.

Figure 5:
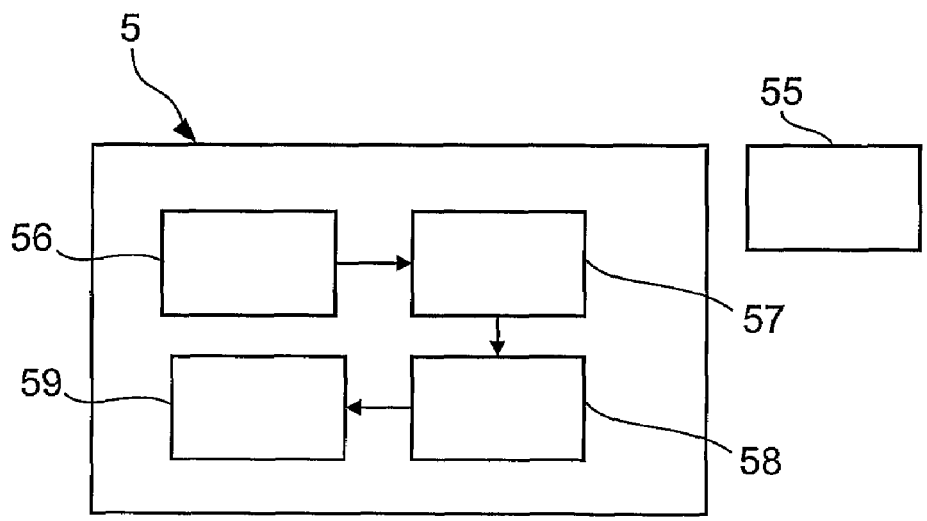
FIG. 5 is a schematic illustration of a computer-readable medium 5 according to an embodiment of another aspect the invention.

A further embodiment of the invention is illustrated in FIG. 5, which shows a computer-readable medium 5. The computer readable medium 5 is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

A computer-readable medium 5 has embodied thereon a computer program for processing by a computer 55. The computer program comprises a plurality of code segments 56, 57, 58, 59 for adaptively minimising the total power consumption of a subsystem comprising a mass storage device and a buffer memory. By means of the code segments an optimum buffer size for which the power consumption of said subsystem is a minimum for a given streaming bit-rate from said buffer memory is calculated. Furthermore, by means of the code segments, the buffer size of said buffer memory is adjusted to said optimum buffer size, such that the power consumption of said subsystem is minimal. More precisely, when e.g. a HDD scheduler initiates a new stream, code segment 56 determines the HDD data rate. A further code segment 57 determines the stream bit-rate to/from the buffer memory. Subsequently, the optimum buffer size, i.e. the buffer size at the above-described minimum of power consumption of the sub-system, is determined by code segment 58. When the optimum buffer size ensuring the lowest power consumption of the subsystem is determined by code segment 58, this optimum buffer size is adjusted by means of code segment 59. Subsequently, the subsystem runs with the lowest energy consumption possible for a given streaming bit-rate.

Applications and use of the above described method, device and computer-readable medium according to the invention are various and include exemplary fields such as the field of portable devices, for instance digital camcorders, personal digital assistants (PDA), but in addition also other systems comprising the above-mentioned subsystem, where power reduction is important. This is for instance the field of computer servers having a large number of such subsystems and where it is desired to minimise dissipated heat, which is proportional to the power consumed.

The present invention has been described above with reference to specific embodiments. However, other embodiments than the preferred above are equally possible within the scope of the appended claims, e.g. different mass storage devices than those described above, implementing the above-mentioned method by hardware or software, etc.

Furthermore, the term "comprises/comprising" when used in this specification does not exclude other elements or steps, the terms "a" and "an" do not exclude a plurality and a single processor or other units may fulfil the functions of several of the units or circuits recited in the claims.

The invention claimed is:

1. A method for adaptively minimizing the total power consumption of an apparatus comprising a subsystem comprising a mass storage device and a buffer memory, said method comprising the steps of:
   determining an optimum buffer size for which the power consumption of said subsystem is a minimum for a given streaming bit-rate to/from said buffer memory; and
   adjusting the buffer size of said buffer memory to said optimum buffer size, such that the power consumption of said subsystem is minimal,
   wherein the storage device is a hard disk drive and the step of determining an optimum buffer size comprises:
   determining a hard disk drive data rate of the hard disk drive;
   determining the stream bit-rate to/from the buffer memory; and
   determining the optimum buffer size having the lowest power consumption at the determined stream bit-rate,
   and wherein said optimum buffer size determination step comprises calculating optimum buffer size from a formula, looking up optimum buffer size in a look-up table, or measuring the minimum power consumption of the subsystem in a feedback loop controlling buffer size.

2. A method for adaptively minimizing the total power consumption of an apparatus comprising a subsystem comprising a mass storage device and a buffer memory, said method comprising the steps of:
   determining an optimum buffer size for which the power consumption of said subsystem is a minimum for a given streaming bit-rate to/from said buffer memory; and
   adjusting the buffer size of said buffer memory to said optimum buffer size, such that the power consumption of said subsystem is minimal, wherein the optimum buffer size is determined by the ratio of the stream bit rate and the disk bit rate giving the duty cycle of the hard disk drive for calculating/estimating the hard disk drive power consumption, which subsequently is used to determine the optimal buffer size.

3. A method for adaptively minimizing the total power consumption of an apparatus comprising a subsystem comprising a mass storage device and a buffer memory, said method comprising the steps of:
   determining an optimum buffer size for which the power consumption of said subsystem is a minimum for a given streaming bit-rate to/from said buffer memory; and
   adjusting the buffer size of said buffer memory to said optimum buffer size, such that the power consumption of said subsystem is minimal, wherein said method further comprises the step of:
   powering up extra memory banks and/or memory integrated circuits (ICs) when a new stream is admitted.

4. A method for adaptively minimizing the total power consumption of an apparatus comprising a subsystem comprising a mass storage device and a buffer memory, said method comprising the steps of:
   determining an optimum buffer size for which the power consumption of said subsystem is a minimum for a given streaming bit-rate to/from said buffer memory; and
   adjusting the buffer size of said buffer memory to said optimum buffer size, such that the power consumption of said subsystem is minimal, wherein a powering down of a memory bank or integrated circuit (IC) is either delayed or the buffered data of that memory bank or IC is moved to another memory bank that will remain powered on after which the first bank is shut down immediately, when a stream is stopped and removed.

5. A method for adaptively minimizing the total power consumption of an apparatus comprising a subsystem comprising a mass storage device and a buffer memory, said method comprising the steps of:
- determining an optimum buffer size for which the power consumption of said subsystem is a minimum for a given streaming bit-rate to/from said buffer memory; and
- adjusting the buffer size of said buffer memory to said optimum buffer size, such that the power consumption of said subsystem is minimal, wherein in case of multiple simultaneous streams, the sum of the bit-rates of all streams is determined.

6. A circuit for retrieving data from a mass storage device via a memory buffer comprising a processing unit conceived to:
- adaptively activate or deactivate areas of said buffer memory in such a manner that total power consumption of a subsystem comprising said storage device and said buffer memory is minimized for a given streaming rate to/from said buffer memory; and
- retrieve the data from the mass storage device,
- wherein the processing unit determines the optimum buffer size by the ratio of the stream bit rate and the disk bit rate giving the duty cycle of the hard disk drive for calculating/estimating the hard disk drive power consumption, which the processing unit subsequently uses to determine the optimal buffer size.

7. An apparatus comprising a subsystem comprising mass storage device, a buffer memory and the circuit according to claim 6.

8. The apparatus according to claim 7, wherein said buffer memory comprises SDRAM circuits having banks of memory adapted to be independently switched on/off.

9. The apparatus according to claim 7, wherein a scheduler function executable by the processing unit controls accessing the storage device and the buffer memory.

10. A computer-readable medium having embodied thereon a computer program for processing by a computer, the computer program comprising code segments for causing the computer to adaptively minimize the total power consumption of a subsystem comprising a mass storage device and a buffer memory, wherein:
- a first code segment causes the computer to determine an optimum buffer size for which the power consumption of said subsystem is a minimum for a given streaming bit-rate from said buffer memory; and
- a second code segment causes said computer to adjust the buffer size of said buffer memory to said optimum buffer size, such that the power consumption of said subsystem is minimal,
- wherein the first code segment causes the computer to determine the optimum buffer size by the ratio of the stream bit rate and the disk bit rate giving the duty cycle of the hard disk drive for calculating/estimating the hard disk drive power consumption, which the computer subsequently uses to determine the optimal buffer size.

11. A method for adaptively minimizing the total power consumption of an apparatus comprising a subsystem comprising a mass storage device and a buffer memory, said method comprising the steps of:
- determining an optimum buffer size for which the power consumption of said subsystem is a minimum for a given streaming bit-rate to/from said buffer memory; and
- adjusting the buffer size of said buffer memory to said optimum buffer size, such that the power consumption of said subsystem is minimal,
- wherein said step of adjusting the buffer size comprises switching on memory banks and/or memory integrated circuits (ICs) of said buffer memory for increasing the size of said buffer memory, and switching off memory banks and/or memory ICs for decreasing said buffer memory,
- wherein the storage device is a hard disk drive and the step of determining an optimum buffer size comprises
- determining a hard disk drive data rate,
- determining the stream bit-rate to/from the buffer memory, and
- determining the optimum buffer size having the lowest power consumption at the determined stream bit-rate,
- and wherein the optimum buffer size is determined by the ratio of the stream bit rate and the disk bit rate giving the duty cycle of the hard disk drive for calculating/estimating the hard disk drive power consumption, which subsequently is used to determine the optimal buffer size.

12. A method for adaptively minimizing the total power consumption of an apparatus comprising a subsystem comprising a mass storage device and a buffer memory, said method comprising the steps of:
- determining an optimum buffer size for which the power consumption of said subsystem is a minimum for a given streaming bit-rate to/from said buffer memory; and
- adjusting the buffer size of said buffer memory to said optimum buffer size, such that the power consumption of said subsystem is minimal,
- wherein said step of adjusting the buffer size comprises switching on memory banks and/or memory integrated circuits (ICs) of said buffer memory for increasing the size of said buffer memory, and switching off memory banks and/or memory ICs for decreasing said buffer memory,
- and wherein the optimum buffer size is determined by the ratio of the stream bit rate and the disk bit rate giving the duty cycle of the hard disk drive for calculating/estimating the hard disk drive power consumption, which subsequently is used to determine the optimal buffer size.

13. A method for adaptively minimizing the total power consumption of an apparatus comprising a subsystem comprising a mass storage device and a buffer memory, said method comprising the steps of:
- determining an optimum buffer size for which the power consumption of said subsystem is a minimum for a given streaming bit-rate to/from said buffer memory; and
- adjusting the buffer size of said buffer memory to said optimum buffer size, such that the power consumption of said subsystem is minimal,
- wherein the storage device is a hard disk drive and the step of determining an optimum buffer size comprises:
- determining a hard disk drive data rate of the hard disk drive;
- determining the stream bit-rate to/from the buffer memory; and
- determining the optimum buffer size having the lowest power consumption at the determined stream bit-rate,
- and wherein the optimum buffer size is determined by the ratio of the stream bit rate and the disk bit rate giving the duty cycle of the hard disk drive for calculating/estimating the hard disk drive power consumption, which subsequently is used to determine the optimal buffer size.

14. The method according to claim 1, wherein the optimum buffer size is determined by the ratio of the stream bit rate and the disk bit rate giving the duty cycle of the hard disk drive for calculating/estimating the hard disk drive power consumption, which subsequently is used to determine the optimal buffer size.

15. A method for adaptively minimizing the total power consumption of an apparatus comprising a subsystem comprising a mass storage device and a buffer memory, said method comprising the steps of:
- determining an optimum buffer size for which the power consumption of said subsystem is a minimum for a given streaming bit-rate to/from said buffer memory; and
- adjusting the buffer size of said buffer memory to said optimum buffer size, such that the power consumption of said subsystem is minimal,
- wherein said step of adjusting the buffer size comprises switching on memory banks and/or memory integrated circuits (ICs) of said buffer memory for increasing the size of said buffer memory, and switching off memory banks and/or memory ICs for decreasing said buffer memory,
- and wherein a powering down of a memory bank or IC is either delayed or the buffered data of that memory bank or IC is moved to another memory bank that will remain powered on, after which the first bank is shut down immediately when a stream is stopped and removed.

16. The apparatus according to claim 8, wherein a scheduler function executable by the processing unit controls accessing the storage device and the buffer memory.

* * * * *